(12) United States Patent
Motazedi et al.

(10) Patent No.: US 10,475,437 B2
(45) Date of Patent: Nov. 12, 2019

(54) SERVICE PROVIDER SUPPORT PLATFORM (71) Applicant: Accenture Global Solutions Limited, Dublin (IE)

(72) Inventors: Eric Motazedi, Centennial, CO (US); Simon Alexander Klaus Kissler, Chicago, IL (US); Matthew Daniel Lancaster, Morrisville, NC (US); Alejandro Leon Escalera, Puebla (MX)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/047,895

(22) Filed: Jul. 27, 2018

(65) Prior Publication Data
US 2019/0035384 A1 Jan. 31, 2019

Related U.S. Application Data (60) Provisional application No. 62/538,162, filed on Jul. 28, 2017.

(51) Int. Cl.
*G10L 15/22* (2006.01)
*G10L 13/04* (2013.01)
*H04W 4/80* (2018.01)
*G06N 20/00* (2019.01)
*G06Q 50/12* (2012.01)
*H04W 4/021* (2018.01)
(Continued)

(52) U.S. Cl.
CPC .......... *G10L 13/043* (2013.01); *G06N 20/00* (2019.01); *G06Q 30/01* (2013.01); *G06Q 30/0281* (2013.01); *G06Q 50/12* (2013.01); *H04W 4/021* (2013.01); *H04W 4/80* (2018.02); *G10L 2015/226* (2013.01)

(58) Field of Classification Search
None
See application file for complete search history.

(56) References Cited

U.S. PATENT DOCUMENTS 8,843,304 B1* 9/2014 Dupont .............. G06Q 30/0207
455/456.1
9,223,826 B2* 12/2015 Peiris ...................... H04L 67/10
(Continued)

FOREIGN PATENT DOCUMENTS

WO 2015/009915 1/2015
WO 2015/103606 7/2015

OTHER PUBLICATIONS

PCT International Search Report and Written Opinion in International Application No. PCT/US2018/044109, dated Sep. 28, 2018, 14 pages.

Primary Examiner — Abul K Azad
(74) Attorney, Agent, or Firm — Fish & Richardson P.C.

(57) ABSTRACT

Methods, systems, and apparatus, including computer programs encoded on a computer storage medium, for helping service providers. The methods, systems, and apparatus include actions of obtaining a mobile computing device identifier, identifying a customer corresponding to the mobile computing device identifier, obtaining information regarding the customer that is identified, determining a likely intent of the customer from the information regarding the customer, and providing, using the likely intent of the customer, information that helps a provider.

20 Claims, 3 Drawing Sheets

(51) Int. Cl.
    *G06Q 30/00*     (2012.01)
    *G06Q 30/02*     (2012.01)

(56) References Cited

U.S. PATENT DOCUMENTS

| | | | |
|---|---|---|---|
| 9,948,744 B1* | 4/2018 | Billau | H04L 67/303 |
| 10,020,004 B2 | 7/2018 | Jones et al. | |
| 2016/0260436 A1* | 9/2016 | Lemay | G10L 15/28 |
| 2016/0360354 A1* | 12/2016 | Rhee | H04W 4/02 |
| 2017/0228732 A1* | 8/2017 | Badenhorst | G06Q 20/3278 |
| 2017/0358302 A1* | 12/2017 | Orr | G06F 17/30026 |
| 2018/0308485 A1* | 10/2018 | Kudurshian | G06F 17/30746 |

\* cited by examiner

SERVICE PROVIDER SUPPORT PLATFORM

CROSS-REFERENCE TO RELATED APPLICATIONS

This application claims priority to U.S. Application Ser. No. 62/538,182, filed on Jul. 28, 2017, the disclosure of which is expressly incorporated herein by reference in its entirety.

TECHNICAL FIELD

This disclosure generally relates to support devices.

BACKGROUND

Service providers may provide service to customers. For example, a valet may park and retrieve a customer's care. In another example, a hotel receptionist may check-in or check-out a customer from a hotel. Service providers may need to converse with customers before they can determine what service to provide customers.

SUMMARY

In general, an aspect of the subject matter described in this specification may involve a process for helping service providers. For example, guest service in hospitality can be somewhat of an anonymous, impersonal affair. The identity of guests of a hotel may be unknown before they announce themselves at a front desk of a hotel. The process may provide information regarding guests that physically approach the employees for service, e.g., identify guest name, guest room number, and likely intent of guest, to the employees even before the guests speak to the employees.

The process may be enabled through portable support devices used by service providers. The portable support devices may be devices that service providers may carry around to receive audible information that helps them provide service to customers. For example, a portable support device may be a battery-powered device carried in a pocket of a service provider that communicates wirelessly with a headset worn by the service provider. The portable support device may use the headset to audibly output information regarding customer identity, customer location, and customer likely intent into the service provider's ear.

Different types of service providers may receive information that is specific to the customer and service provider. For example, a valet might receive different information than information received by a front desk clerk or a housekeeping personnel. By providing information audibly to service providers, the portable support device may avoid having service providers appearing bored or distracted by looking away from guests towards a screen. However, in some implementations information may additionally or alternatively be provided visually to service providers. For example, a screen that a front desk clerk uses may be automatically updated with information for a customer approaching to check in.

The portable support devices may detect mobile computing device identifiers broadcast by mobile computing devices, e.g., smart phones, tablets, or other devices, carried by customers. For example, a portable support device worn by a hotel receptionist may detect that a nearby device is broadcasting a Bluetooth® MAC (media access control) address of "00:11:22:33:44:55."

The portable support devices may provide the device identifier information to a support platform. For example, the portable support device may provide the Bluetooth® address of "00:11:22:33:44:55" and an indication that the signal is detected at −27 decibel-milliwatts (dBm). The support platform may receive device identifier information from the portable support devices and provide information that helps the service provider provide service to the customer. For example, the support platform may provide synthesized speech of "Five foot ten inch male with brown hair approaching the counter is John Doe and is likely checking in. He is a platinum level member and will be celebrating his birthday during his stay" to the portable support device of a hotel concierge.

The support platform may receive device identifier information from multiple portable support devices and analyze the received device identifier information to generate information to help a provider give service to the customer. For example, the support platform may receive a Bluetooth® address of John Does' phone from portable support devices carried by a valet, a bellboy, and a hotel receptionist, use localization on received device identifier information to track movement of John Doe's phone, and determine from the movement that John Doe walked from a front door of the hotel towards the check-in desk so likely intends to check in. In response, the support platform may provide synthesized speech of "He is a platinum level member and will be celebrating his birthday during his stay" to the portable support device of a hotel concierge" to the portable support device of the hotel concierge.

In some aspects, the subject matter described in this specification may be embodied in methods that may include the actions of obtaining a mobile computing device identifier; identifying a customer corresponding to the mobile computing device identifier; obtaining information regarding the customer that is identified; determining a likely intent of the customer from the information regarding the customer; and providing, using the likely intent of the customer, information that helps a provider.

Other embodiments of these aspects include corresponding systems, apparatus, and computer programs, configured to perform the actions of the methods, encoded on computer storage devices.

These and other embodiments may each optionally include one or more of the following features. For instance, obtaining the mobile computing device identifier includes detecting a Bluetooth® broadcast from the mobile computing device. Obtaining information regarding the customer that is identified includes receiving synthesized speech. Obtaining information regarding the customer that is identified includes providing audio to a remote support platform server computing system, the audio regarding the customer; and receiving a response to the audio, the response include synthesized speech including the information regarding the customer that is identified. Determining the likely intent of the customer includes identifying a signal strength associated with the mobile computing device identifier at one or more portable support devices that detect the mobile computing device identifier; determining, based on i) the signal strengths at the one or more portable support devices and ii) the mobile computing device identifier, a location of the customer; and determining, based on the location of the customer, the likely intent of the customer. Determining the location of the customer can include comparing the signal strengths at the one or more portable support devices; and based on the comparison and known locations of the one or more portable support devices, determining the location of the customer. Determining the location of the customer further includes determining a fingerprint of the mobile computing device based on i) the signal strengths at the one or more portable support devices and ii) the mobile computing device identifier; comparing the fingerprint of the mobile computing device with one or more previously predetermined fingerprints associated with a physical environment of the mobile computing device; based on the comparison, matching the fingerprint of the mobile computing device with a particular previously predetermined fingerprint; based on the match, identifying a particular location within a coordinate system of the physical environment; and associating the particular location as the location of the customer. Determining the likely intent of the customer includes applying machine learning to the information to determine the likely intent of the customer.

Particular implementations of the subject matter described in this specification can be implemented so as to realize one or more of the following advantages. For example, implementations of the subject matter provide for the efficient usage of computer resources by automating identification of (mobile) computing devices and/or persons associated with the computing devices within a physical environment. For example, when a computing device enters an area (pre-mapped physical environment), a computing system can automatically determine the location of the computing device, minimizing extra processing steps for such detection related to determining whether to identify the location of the computing device, waiting for a response from the computing device, and subsequent detection of the location. Rather this process is automated, providing a streamlined use of computer resources of the computing system, minimizing processing steps while performing the same tasks that otherwise would be performed with additional processing steps if the process wasn't automated.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference symbols in the various drawings indicate like elements.

DETAILED DESCRIPTION

Figure 1:
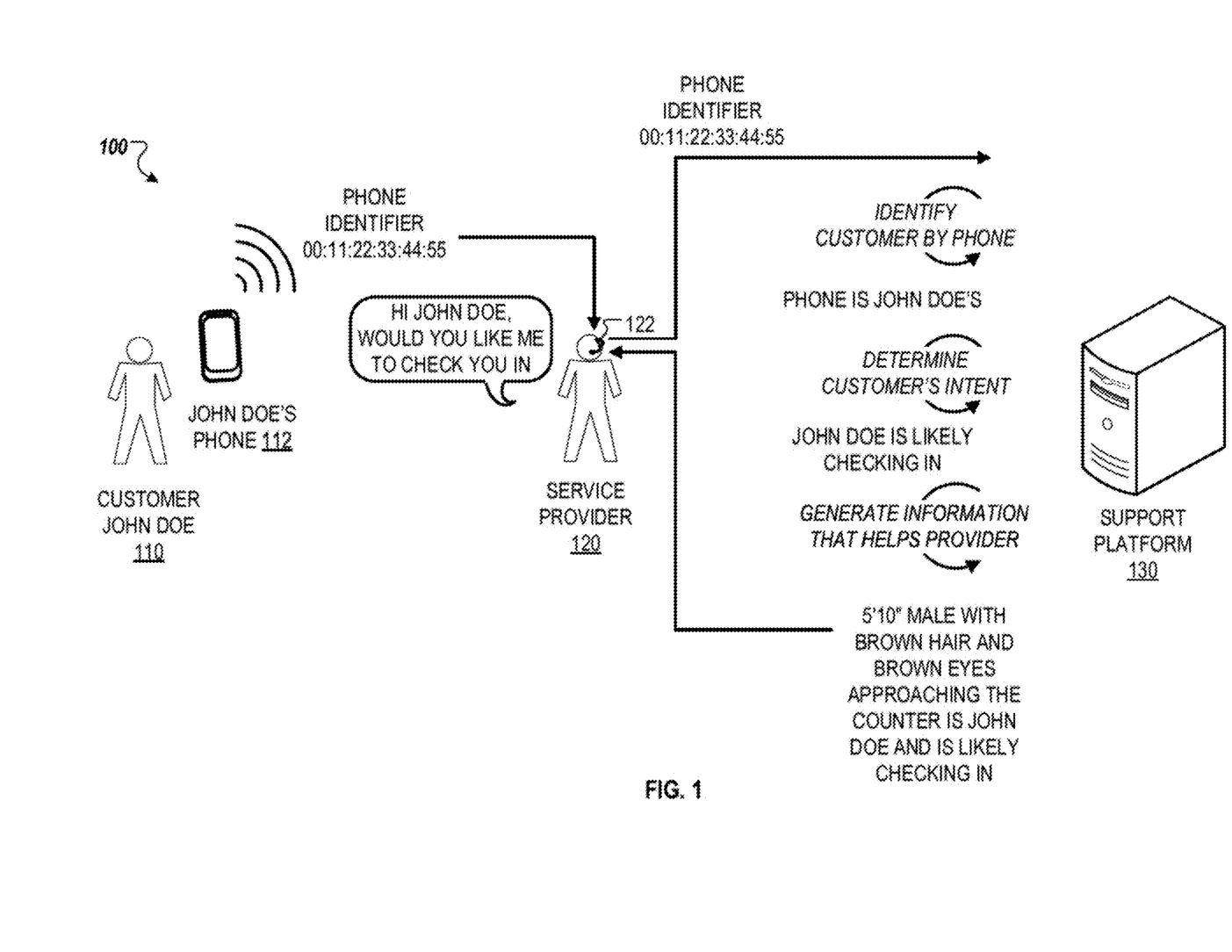
FIG. 1 illustrates a diagram of an exemplary system for helping service providers.

FIG. 1 illustrates an exemplary system 100 for helping service providers. The system 100 includes a phone 112 of a customer 110, a portable support device 122 used by a service provider 120, and a support platform 130. While the system 100 includes a phone 112 of a customer 110, the system 100 may also use another type of mobile computing device, e.g. a tablet, a laptop, or a smartwatch, or some other device carried by customers. The support platform 130 can include a remote server having a memory (data store). The portable support device 122 has a local memory, and in some examples, the local memory of the portable support device 122 is smaller in storage capability than the memory of the support platform 130.

The phone 112 of the customer 110 may broadcast a phone identifier. For example, the phone 112 of John Doe may broadcast a Bluetooth® address of "00:11:22:33:44:55." The broadcast of the phone identifier may be a broadcast that is performed without an explicit action by the customer 110. For example, the customer 110 may enable Bluetooth® on the phone 112 and the phone 112 may broadcast the Bluetooth® address every one hundred, two hundred, five hundred, one thousand, two thousand milliseconds or some other amount of time without the customer 110 requesting that the phone 112 broadcast the Bluetooth® address after enabling Bluetooth® on the phone 112.

The portable support device 122 may be a small battery-powered device carried by the service provider 120. For example, the portable support device 122 may be a device that is carried in a pocket of the service provider 120 that is in Bluetooth® communication with a headset worn by the service provider 120. In some examples, the portable support device 122 may include functionality of a headset and be worn on an ear of the service provider 120. The portable support device 122 may be a low cost commodity type device that can be easily replaced and interchanged between service providers. In a first example, the service providers can be identified based on voice detection of the service providers. In some other examples, the portable support devices may have unique serial numbers and a service provider may register the unique serial number of the portable support device the provider is using with the support platform 130. Whenever the service provider replaces the portable support device with another portable support device, the service provider may register the unique serial number of the replacement portable support device with the support platform 130. The serial number of the replaced portable support device may then be automatically de-registered with the provider by the support platform 130 or manually de-registered by the provider.

The portable support device 122 may detect a phone identifier broadcast by the phone 112. For example, the portable support device 122 may include a Bluetooth® transceiver and once the phone 112 is within a predetermined distance (e.g., thirty feet) of the portable support device 122, the transceiver may receive a Bluetooth® broadcast from the phone 112 that indicates that the broadcast came from a device with the Bluetooth® address "00:11:22:33:44:55." In some examples, the portable support device 122 may include a WiFi transceiver and once the phone 112 is within a predetermined distance (e.g., one hundred feet) of the portable support device 122, the WiFi transceiver may receive a WiFi broadcast from the phone 112 that indicates that the broadcast came from a device with the MAC address "00:11:22:33:44:55."

The portable support device 122 may provide the phone identifier to the support platform 130. For example, the portable support device 122 may provide to the support platform 130 the Bluetooth® address of "00:11:22:33:44:55" along with an indication that the detected signal strength was −27 dBW.

In response to providing the phone identifier to the support platform 130, the portable support device 122 may receive information that helps the service provider 120 provide service to the customer 110. For example, the portable support device 122 may receive, from the support platform 130, synthesized speech of "Five foot ten inch male with brown hair approaching the counter is John Doe and is likely checking in." In some examples, the support platform 130 can initiate a process of checking John Doe into the hotel. In some examples, the service provider 120 may use the information provided by the portable support device 122 to, even before John Doe says anything to the service provider 120, greet the guest by saying "Hi John Doe, would you like me to check you in" and interact with a receptionist console to initiate the process of checking John Doe in to the hotel. In some implementations, the portable support device 122 may obtain input from the service provider 120 requesting additional information. For example, the portable support device 122 may use a microphone to receive audio corresponding to the service provider 120 saying "Support platform, please repeat," "Support platform, how many people in his party," or some other request. Other examples might include, the service provider 120 saying "Support platform, check if the customer's room is ready" or "Support platform, let bell service know to deliver customer's bags."

In some examples, the support platform 130 provides the information to the portable support device 122 (that helps the service provider 120 provide service to the customer 110) prior to interaction with the customer 110 (e.g., prior to the process of checking John Doe into the hotel). Specifically, the portable support device 122 stores such information as data in a cache (or data store) of the portable support device 122. The portable support device 122 stores the data in the cache in advance—that is, prior to utilization of such data by the portable device 122. In some examples, the portable support device 122 stores the data in the cache prior to providing the information to the service provider 120. As a result, by having this data previously stored in the cache, processing improvements of the portable support device 122 are afforded. That is, the portable support device 122 is able to do any computational processing on this stored data prior to engagement by the service provider 120 with the customer 110 (e.g., checking in John Doe).

For example, based on the advanced cached data, the portable support device 122 is able to determine the customer's room availability or delivery status of the customer's bag, based on the cached data. By storing and performing any computations on such data in advance, the portable support device 122 is able to more efficiently interact with the service provider 120. Furthermore, latency of the portable support device 122 being able to provide such information to the service provider 120 is improved, and the overall speed performance of the portable support device 122 is improved.

Additionally, access between the portable support device 122 and the support platform 130, and in particular, access of data stored by the support platform 130 by the portable support device 122, can be limited (or slower) as compared to access to the cache by the portable support device 122. Specifically, the rate of access of data by the portable support device 122 to the cache (of the portable support device 122) can be faster as compared to the rate of access of data by the portable support device 122 to the memory of the support platform 130. Thus, by having the data stored in advance at the cache of the portable support device 122, latency of the portable support device 122 can be improved.

The portable support device 122 may provide the request to the support platform 130 and the support platform 130 may generate a response to the request and provide the response back to the portable support device 122. For example, the portable support device 122 may provide the audio of the provider 120 saying "Support platform, how many people in his party" to the support platform 130, the support platform 130 may transcribe the audio and determine from the transcription that the provider 120 wants to know how many people are in a guest's party, determine that the guest's reservation indicates that there are four people in the party, and, in response, provide synthesized speech of "There are four people in his party" to the provider 120.

The support platform 130 may be a cloud service platform or one or more servers that receive the phone identifier and identify a customer by phone. For example, the support platform 130 may be a cloud service platform that receives the Bluetooth® address "00:11:22:33:44:55" and determines that the Bluetooth® address has been previously stored as that used by a phone of "John Doe."

The support platform 130 may then determine opportunities for interaction with the customer 110. In some cases, opportunities for interaction can be referred to as a likely intent of the customer 110. For example, the support platform 130 may determine that John Doe is near a hotel receptionist based on the phone identifier and the signal strength information received from portable support devices used by a valet, a bellhop, and a hotel receptionist, determine that John Doe walked through a front door of the hotel directly to his current location, and determine that John Doe has a reservation at the hotel for that day and has not yet checked in. In response, the support platform 130 may determine that John Doe is likely checking in to the hotel.

In some implementations, the support platform 130 may determine a location of the customer 110 by localization of the phone 112 through comparison of the signal strength of signals from the phone 112 detected by multiple portable support devices and known locations of the multiple portable support devices.

In some examples, the support platform 130 may determine that John Doe is near a hotel receptionist based on the phone identifier and the signal strength information received from portable support devices used by a valet, a bellhop, and a hotel receptionist, determine that John Doe walked from his hotel room directly to his current location, and determine that John Doe has a reservation at the hotel that ends that day and has not yet checked out. In response, the support platform 130 may determine that John Doe is likely checking out of the hotel.

In some examples, the support platform 130 may perform localization to determine that John Doe is near a valet based on the phone identifier and the signal strength information received from portable support devices used by a valet, a bellhop, and a hotel receptionist, determine that John Doe appears to have been moving quickly along a road to the front door of the hotel so is likely in a vehicle, and determine that John Doe valet parked his car yesterday. In response, the support platform 130 may determine that John Doe is likely valeting his car.

In some implementations, the support platform 130 can determine the location of John Doe using Bluetooth® fingerprinting. Specifically, using Bluetooth® fingerprinting, the customer 110, the phone 112, or both, can be located within a pre-defined area (such as a hotel lobby in the continuing example). A mapping of the area can be performed initially using the portable support devices in support of SLAM (simultaneous localization and mapping). In particular, a map of a pre-defined area (such as the hotel lobby) can be determined by using robotic mapping employing SLAM with the portable support devices. During mapping of the area, an entity, such as an autonomous robotic system (e.g., robotic system employing LIDAR), calculates multiple signal profiles (e.g., Bluetooth® or WiFi fingerprints) based on the physical environment. For example, during mapping, the support platform 130 identifies multiple ambient signals and recombines such to provide "fingerprints" associated with the physical environment. The multiple ambient signals can include reflected and/or permutated signals. In some examples, the support platform 130 can utilize machine learning (such as artificial neural networks or deep learning) in support of identifying the fingerprints associated with the physical environment. Further, the support platform 130 can generate a coordinate system of the physical environment based on such mapping.

After obtaining, by the support platform 130, a mapping of the physical environment, locations of physical objects (such as portable computing devices and/or persons) can be determined within the physical environment. In some examples, as portable computing devices, such as the phone 112, move within the physical environment, the portable support devices (e.g. Bluetooth® portable support devices or passive radio frequency receivers) can each identify signals (e.g., ambient electromagnetic field readings) associated with the phone 112 (e.g., signals provided by the phone 112, and/or signals provided by the portable support devices and reflected by the phone 112). The support platform 130 can process such signals, and identify a (location) fingerprint associated with the phone 112. The support platform 130 analyze the fingerprint associated with the phone 112, and compares such based on the mapping of the physical environment, and specifically, the previously predetermined fingerprints (e.g., as identified by the autonomous robotic system). Based on the comparison, the support platform 130 can match the fingerprint associated with the phone 112 with a particular previously predetermined fingerprint. Based on such match, the support platform 130 can identify a location within the coordinate system of the physical environment that is associated with the particular previously predetermined fingerprint. This location can then be determined to be associated with the phone 112. In other words, the support platform 130 can determine a state profile of the phone 112 (e.g., by machine learning such as neural networks) to determine the most likely source of transmission (e.g., the phone 112) within the (mapped) physical environment.

In some examples, the support platform 130 can further track locations of persons (independent of tracking of portable computing devices used by the persons as they are being tracked, or in coordination with tracking of such portable computing devices). For example, the support platform can utilize active video or radar-based tracking to determine a location of the person(s) being tracked.

In some examples, the support platform 130 can continuously receive information identifying the location of one more phones (e.g., phones 112) within the pre-defined area (such as the hotel lobby in this continuing example). The support platform 130 can update the cache of one or more of the portable support devices 122 located within or proximate to the pre-defined area to include such location information of the phones. Thus, the local memory of each of the portable support device 122 can contain data pertaining to the location of the customers. Further, if the customer (and the phone) have been moved outside of the pre-defined area, the support platform 130 can further update the memory of each of the portable support devices 122 to remove such relevant data.

In some examples, the support platform 130 can identify paths taken by the customer within the pre-defined area. For example, the support platform 130, based on location history associated with the customer, can identify one or more paths that are typically taken by the customer. The location data of these paths of the customer can be stored by the memory of the support platform 130. The support platform 130 can then, based on upon detection of a new location of the customer, determine one or more possible paths that could be taken by the customer. Upon the customer moving within the pre-defined area (as determined by location determination mentioned above), the support platform 130 can identify one or more portable support devices 122 located proximate to the possible path taken by the customer. The support platform 130 can provide to the identified portable support devices 122 the appropriate information (e.g., the information that helps the service provider 120 provide service to the customer 110). As the customer continues to move, the support platform 130 can identify new portable support devices that are located proximate to an updated path of the customer to provide the appropriate information to. In some examples, the support platform 130 can utilize machine learning in the identification of the path of the customer.

In some implementations, the support platform 130 may determine opportunities for interaction with the customers, including likely intents of the customer, through machine learning. For example, the support platform 130 may use neural networks that are trained to recognize that particular sets of information regarding customers, including customer movement, correspond to particular likely intents of customers, and/or opportunities for interaction with the customers.

Based on the likely intent determined for a customer, the support platform 130 may generate information that helps the service provider 120. For example, the support platform 130 may determine that John Doe is likely checking in and in response, generate synthesized speech of "Five foot ten inch male with brown hair approaching the counter is John Doe and is likely checking in." The support platform 130 may generate information that identifies the customer 110 to the service provider 120, e.g., through one or more of describing the customer's appearance or location, and indicates the customer's likely intent, e.g., describes what action the customer is likely seeking. The information generated by the support platform 130 may additionally or alternatively describe one or more of the customer's service history, the customer's preferences, and other information regarding the customer.

In some implementations, the system 100 may additionally or alternatively include support devices that are not portable. For example, the system 100 may include support devices that are affixed to a receptionist desk or a valet booth. In the case where a single support device may be used by multiple service providers, headsets worn by service providers may be registered with the support platform 130 or the fixed support devices so that the appropriate service provider receives information from the support platform 130. In some examples, a non-portable support device may detect devices of customers and provide the phone identifier to the support platform 130, and the support platform 130 may then provide information to another support device that is carried by a service provider that will be relevant to addressing a customer's determined likely intent. In some examples, the support platform 130 may tailor the information provided to the service provider based on the role of the service provider, e.g., a front desk clerk might receive information about whether a customer's room is ready and a valet might receive information about an estimated time needed to retrieve a customer's vehicle. In some implementations, the support platform 130 may additionally or alternatively interact with other devices used by support providers. For example, the support platform 130 may provide visual check-in information for John Doe onto a screen of a receptionist console screen known to be used by a receptionist carrying the portable support device 120 to provide the identifier for John. Doe's phone to the support platform 130. In some implementations, the support platform 130 may blend information from a variety of sources. For example, the support platform 130 may integrate with a security camera system to capture an image of a guest, add the image to a customer's profile, and then present the image on the screen of the receptionist console screen.

The support platform 130 can detect voice activity from the customer 110. The support platform 130 can as well detect multiple, individual voice activity from multiple customers. In particular, the support platform 130 can include multiple audio receivers such as microphones positioned with a physical environment (e.g., the hotel lobby in the continuing example). The audio receivers can transmit the audio data to a server computing system (remote or local to the physical environment). For example, the support platform 130 can include the server computing system. The audio receivers can continuously transmit such audio data to the server computing system, and in some examples, transmit independent of activation of a "hotword" or "keyword" that can be provided by the customers. In other words, the server computing system can utilize a persistent bi-directional audio connection in support of an episodic memory and understanding of ongoing conversation.

Figure 2:
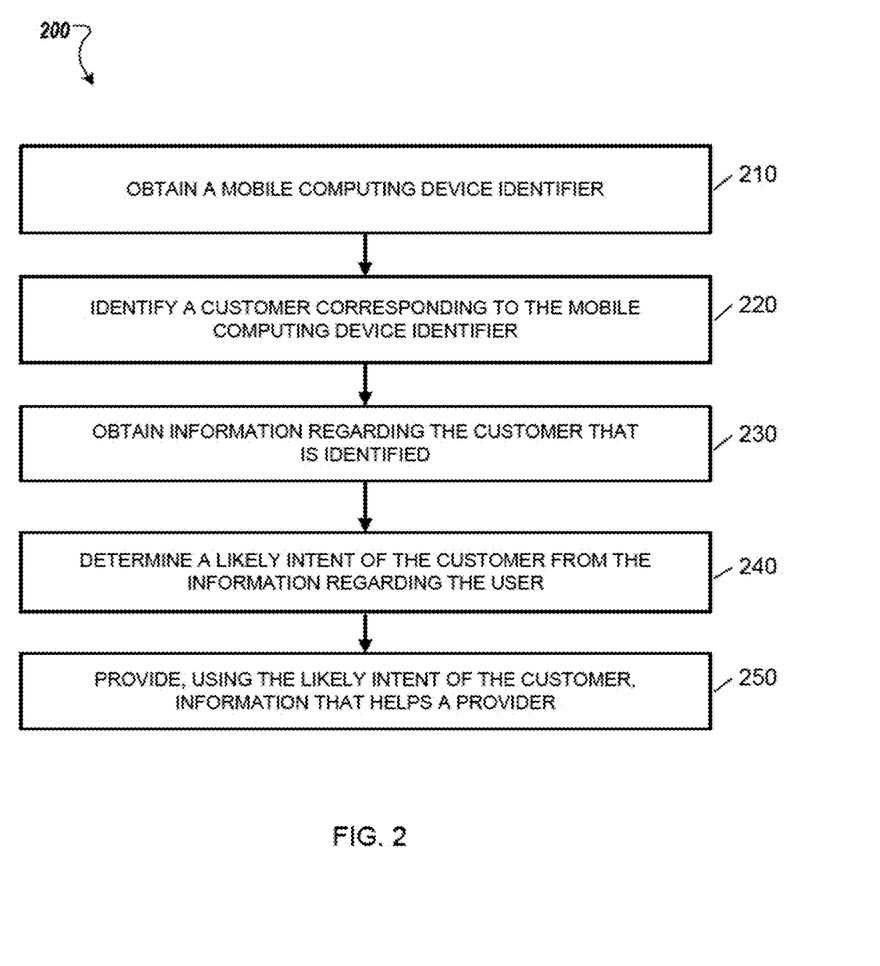
FIG. 2 illustrates an exemplary process for helping service providers.

FIG. 2 illustrates an exemplary process 200 for helping service providers. The operations of the process 200 are described generally as being performed by the support platform 130. However, the process 200 may be performed by other systems or other configurations of the system 100.

The process 200 includes obtaining a mobile computing device identifier (210). For example, the support platform 130 may receive a MAC address of "01:23:45:67:89:AB" for a phone of Jane Doe in response to the portable support device 122 detecting a WiFi broadcast that includes data that indicates the broadcast originated from a device with that MAC address.

The process 200 includes identifying a customer corresponding to the mobile computing device identifier (220). For example, the support platform 130 may determine that the MAC address of "01:23:45:67:89:AB" is used by a tablet that Jane Doe used to access a tablet application of a hotel.

The process 200 includes obtaining information regarding the customer that is identified (230). For example, the support platform 130 may obtain information describing other portable support devices 122 recently detecting Jane Doe's tablet to determine recent localized movements of Jane Doe's tablet and obtain profile information of Jane Doe that describes whether Jane Doe has a reservation, whether Jane Doe is checked in, and whether Jane Doe has previously valet parked.

The process 200 includes determining a likely intent of the customer from the information regarding the customer (240). For example, the support platform 130 may determine that Jane Doe appears to be in a vehicle that has driven up to a valet, that Jane Doe is checked in to the hotel, and that Jane Doe has previously used valet parking at the hotel and, in response, determine that Jane Doe intends to valet park. In another example, the support platform 130 may determine that Jane Doe has walked from a bellhop to a concierge, to a front desk, is not check in, hasn't been at a hotel that day or yesterday, and has a reservation and, in response, determine that Jane Doe is likely checking in.

The process 200 includes providing, using the likely intent of the customer, information that helps the provider (250). For example, the support platform 130 may determine that based on the likely intent of valet parking, the valet should be informed that a guest named Jane Doe intends to park her car, and that she has a reservation at the hotel. In response, the support platform 130 may generate synthesized speech of "Jane Doe is staying at the hotel and she is approaching in a black sedan." The support platform 130 may provide the information to the portable support device 122 of the valet. Once a black sedan pulls up to the valet, the valet may then say, "Welcome back to the hotel Jane Doe, would you like me to park your car?"

Figure 3:
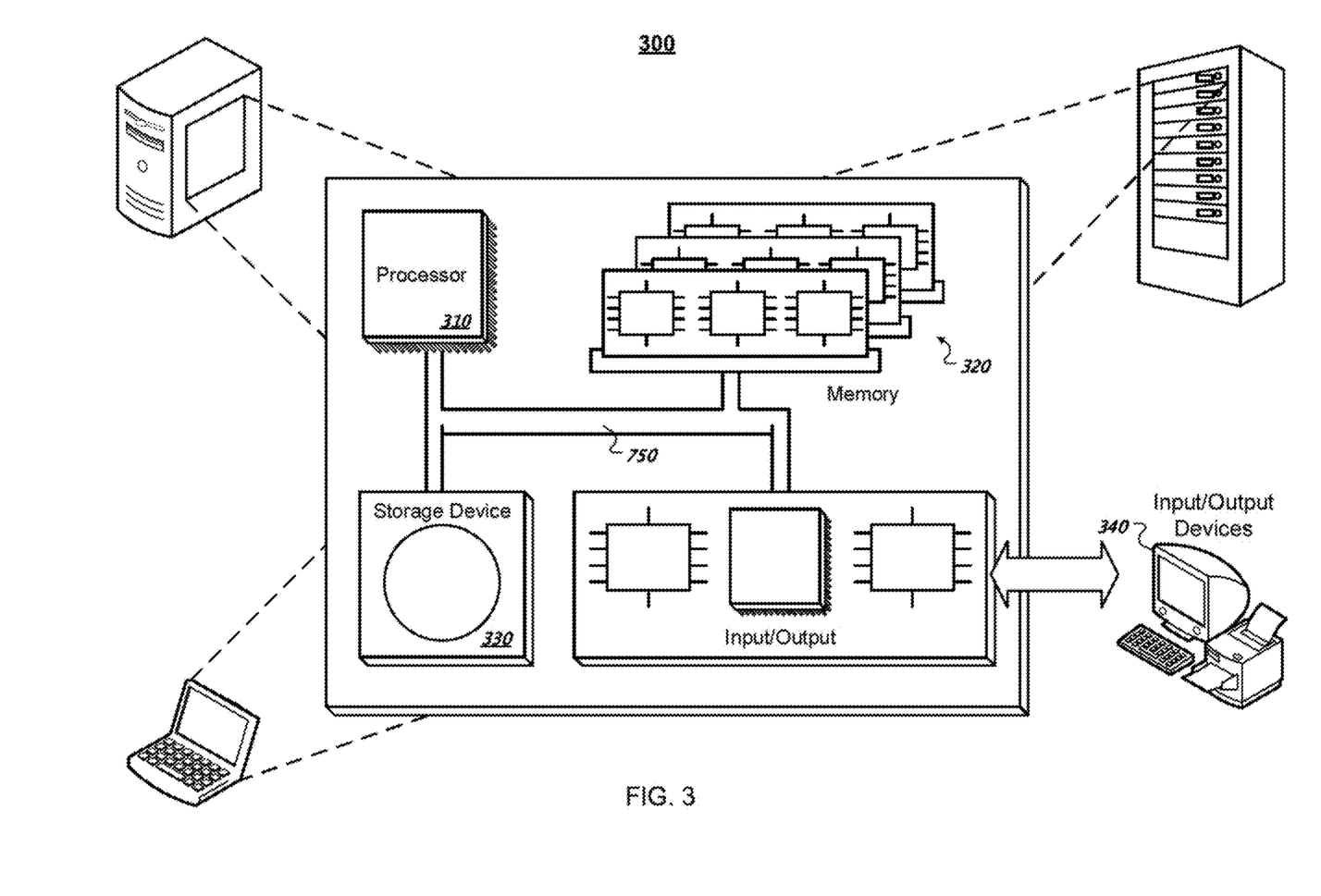
FIG. 3 illustrates a schematic diagram of an exemplary generic computer system.

FIG. 3 illustrates a schematic diagram of an exemplary generic computer system. The system 300 can be used for the operations described in association with the process 200 according to some implementations. The system 300 may be included in the system 100.

The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a hard disk device, a solid state drive, an optical disk device, a tape device, universal serial bus stick, or some other storage device.

The input/output device 340 provides input/output operations for the system 300. In one implementation, the input/output device 340 includes a keyboard and/or pointing device. In another implementation, the input/output device 340 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits) and/or FPGAs (Field Programmable Gate Array).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an. Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. The servers may be part of a cloud, which may include ephemeral aspects.

What is claimed is:

1. A computer-implemented method comprising:
   obtaining a mobile computing device identifier included in a broadcast by a mobile computing device of a customer;
   identifying the customer corresponding to the mobile computing device identifier;
   determining, for each of multiple support devices that detect the broadcast by the mobile computing device of the customer, a signal strength of the broadcast detected at the support device;
   determining, based on the signal strengths detected at the multiple support devices, a current location of the customer;
   obtaining information regarding the customer that is identified, where the information includes a prior location of the customer determined based on a prior set of signal strengths detected at the multiple support devices and indicates a reservation of the customer;
   determining a likely intent of the customer from the information regarding the customer based on the current location of the customer determined based on the signal strengths detected at the multiple support devices, the prior location of the customer determined based on the prior set of signal strengths detected at the multiple support devices, and the reservation of the customer; and
   providing, to a particular support device used by a provider and using the likely intent of the customer, information regarding the customer that helps the provider interact with the customer.

2. The method of claim 1, wherein obtaining the mobile computing device identifier includes detecting a Bluetooth® broadcast from the mobile computing device.

3. The method of claim 1, wherein obtaining information regarding the customer that is identified includes receiving synthesized speech.

4. The method of claim 1, wherein obtaining information regarding the customer that is identified includes:
   providing audio to a remote support platform server computing system, the audio regarding the customer; and
   receiving a response to the audio, the response include synthesized speech including the information regarding the customer that is identified.

5. The method of claim 1, wherein determining the current location of the customer includes:
   comparing the signal strengths at the multiple support devices; and
   based on the comparison and known locations of the multiple support devices, determining the current location of the customer.

6. The method of claim 1, wherein determining the current location of the customer includes:
   determining a fingerprint of the mobile computing device based on i) the signal strengths at the multiple support devices and ii) the mobile computing device identifier;
   comparing the fingerprint of the mobile computing device with one or more previously predetermined fingerprints associated with a physical environment of the mobile computing device;
   based on the comparison, matching the fingerprint of the mobile computing device with a particular previously predetermined fingerprint;
   based on the match, identifying a particular location within a coordinate system of the physical environment; and
   associating the particular location as the current location of the customer.

7. The method of claim 1, wherein determining the likely intent of the customer includes applying machine learning to the information to determine the likely intent of the customer.

8. The method of claim 1, wherein determining a likely intent of the customer from the information regarding the customer based on the current location of the customer determined based on the signal strengths detected at the multiple support devices, the prior location of the customer determined based on the prior set of signal strengths detected at the multiple support devices, and the reservation of the customer comprises:
   determining that the reservation is for a particular hotel, that the customer has not checked-in yet to the particular hotel, and that the customer moved from a front door of the particular hotel to the current location; and
   in response to determining that the reservation is for the particular hotel, that the customer has not checked-in yet to the particular hotel, and that the customer moved from the front door of the particular hotel to the current location, determining that the customer is likely checking in to the particular hotel.

9. The method of claim 1, wherein determining a likely intent of the customer from the information regarding the customer based on the current location of the customer determined based on the signal strengths detected at the multiple support devices, the prior location of the customer determined based on the prior set of signal strengths detected at the multiple support devices, and the reservation of the customer comprises:
- determining that the customer has driven up to a valet at a particular hotel and that the reservation is for the customer at the particular hotel; and
- in response to determining that the customer has driven up to the valet at the particular hotel and that the reservation is for the customer at the particular hotel, determining that the customer is likely intends to valet park their vehicle.

10. The method of claim 1, wherein providing, to a particular support device used by a provider and using the likely intent of the customer, information regarding the customer that helps the provider interact with the customer comprises:
- determining a likely path that the customer will take based on the likely intent of the customer;
- determining that the provider that uses the particular support device is along the likely path; and
- in response to determining that the provider that uses the particular support device is along the likely path, providing the information regarding the customer to the particular support device used by the provider.

11. A system comprising:
one or more computers and one or more storage devices storing instructions that are operable, when executed by the one or more computers, to cause the one or more computers to perform operations comprising:
- obtaining a mobile computing device identifier included in a broadcast by a mobile computing device of a customer;
- identifying the customer corresponding to the mobile computing device identifier;
- determining, for each of multiple support devices that detect the broadcast by the mobile computing device of the customer, a signal strength of the broadcast detected at the support device;
- determining, based on the signal strengths detected at the multiple support devices, a current location of the customer;
- obtaining information regarding the customer that is identified, where the information includes a prior location of the customer determined based on a prior set of signal strengths detected at the multiple support devices and indicates a reservation of the customer;
- determining a likely intent of the customer from the information regarding the customer based on the current location of the customer determined based on the signal strengths detected at the multiple support device, the prior location of the customer determined based on the prior set of signal strengths detected at the multiple support devices, and the reservation of the customer; and
- providing, to a particular support device used by a provider and using the likely intent of the customer, information regarding the customer that helps the provider interact with the customer.

12. The system of claim 11, wherein obtaining the mobile computing device identifier includes detecting a Bluetooth® broadcast from the mobile computing device.

13. The system of claim 11, wherein obtaining information regarding the customer that is identified includes receiving synthesized speech.

14. The system of claim 11, wherein obtaining information regarding the customer that is identified includes:
- providing audio to a remote support platform server computing system, the audio regarding the customer; and
- receiving a response to the audio, the response include synthesized speech including the information regarding the customer that is identified.

15. The system of claim 11, wherein determining the current location of the customer includes:
- determining a fingerprint of the mobile computing device based on i) the signal strengths at the multiple support devices and ii) the mobile computing device identifier;
- comparing the fingerprint of the mobile computing device with one or more previously predetermined fingerprints associated with a physical environment of the mobile computing device;
- based on the comparison, matching the fingerprint of the mobile computing device with a particular previously predetermined fingerprint;
- based on the match, identifying a particular location within a coordinate system of the physical environment; and
- associating the particular location as the current location of the customer.

16. The system of claim 11, wherein determining the likely intent of the customer includes applying machine learning to the information to determine the likely intent of the customer.

17. A non-transitory computer-readable medium storing software comprising instructions executable by one or more computers which, upon such execution, cause the one or more computers to perform operations comprising:
- obtaining a mobile computing device identifier included in a broadcast by a mobile computing device of a customer;
- identifying the customer corresponding to the mobile computing device identifier;
- determining, for each of multiple support devices that detect the broadcast by the mobile computing device of the customer, a signal strength of the broadcast detected at the support device;
- determining, based on the signal strengths detected at the multiple support devices, a current location of the customer;
- obtaining information regarding the customer that is identified, where the information includes a prior location of the customer determined based on a prior set of signal strengths detected at the multiple support devices and indicates a reservation of the customer;
- determining a likely intent of the customer from the information regarding the customer based on the current location of the customer determined based on the signal strengths detected at the multiple support devices, the prior location of the customer determined based on the prior set of signal strengths detected at the multiple support devices, and the reservation of the customer; and
- providing, to a particular support device used by a provider and using the likely intent of the customer, information regarding the customer that helps the provider interact with the customer.

18. The computer-readable medium of claim 17, wherein obtaining the mobile computing device identifier includes detecting a Bluetooth® broadcast from the mobile computing device.

19. The computer-readable medium of claim 17, wherein obtaining information regarding the customer that is identified includes receiving synthesized speech.

20. The computer-readable medium of claim 17, wherein obtaining information regarding the customer that is identified includes:
- providing audio to a remote support platform server computing system, the audio regarding the customer; and
- receiving a response to the audio, the response include synthesized speech including the information regarding the customer that is identified.

* * * * *

UNITED STATES PATENT AND TRADEMARK OFFICE
CERTIFICATE OF CORRECTION

PATENT NO.        : 10,475,437 B2
APPLICATION NO.   : 16/047895
DATED             : November 12, 2019
INVENTOR(S)       : Motazedi et al.

Page 1 of 1

It is certified that error appears in the above-identified patent and that said Letters Patent is hereby corrected as shown below:

In the Specification

Column 1, Line 7 (approx.), under "CROSS-REFERENCE TO RELATED APPLICATIONS," delete "62/538,182," and insert -- 62/538,162, --, therefor.

Signed and Sealed this
Twenty-first Day of January, 2020

Andrei Iancu
*Director of the United States Patent and Trademark Office*